United States Patent
Holland et al.

(10) Patent No.: US 7,097,031 B2
(45) Date of Patent: Aug. 29, 2006

(54) LUBRICIOUS LINERS AND METHODS FOR THEIR USE

(75) Inventors: Brian T. Holland, Chicago, IL (US); Gregory T. Robitaille, Cincinnati, OH (US); Jim J. Hilarides, Lake Geneva, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 69 days.

(21) Appl. No.: 10/711,428

(22) Filed: Sep. 17, 2004

(65) Prior Publication Data

US 2005/0082143 A1    Apr. 21, 2005

Related U.S. Application Data

(60) Provisional application No. 60/513,384, filed on Oct. 22, 2003.

(51) Int. Cl.
*B65G 15/60*    (2006.01)
(52) U.S. Cl. .................................... 198/841; 198/500
(58) Field of Classification Search ............. 198/500, 198/493, 841
See application file for complete search history.

(56) References Cited

U.S. PATENT DOCUMENTS

| | | | | |
|---|---|---|---|---|
| 4,562,921 A | * | 1/1986 | Leemkuil et al. | 198/841 |
| 5,074,407 A | * | 12/1991 | Brumby | 198/841 |
| 5,601,180 A | * | 2/1997 | Steeber et al. | 198/502.1 |
| 5,779,027 A | * | 7/1998 | Ensch et al. | 198/841 |
| 5,988,363 A | * | 11/1999 | Takahashi et al. | 198/841 |
| 6,071,354 A | * | 6/2000 | Williams | 198/500 |
| 6,216,842 B1 | | 4/2001 | Beale et al. | 193/20 |
| 6,935,483 B1 | * | 8/2005 | Veit et al. | 198/841 |
| 2001/0003733 A1 | | 6/2001 | Kupper et al. | 508/181 |

FOREIGN PATENT DOCUMENTS

WO    WO 01/07544 A1    2/2001

* cited by examiner

*Primary Examiner*—James R. Bidwell
(74) *Attorney, Agent, or Firm*—Gregory S. Bollis; James J. Sales; Renee J. Rymarz

(57) ABSTRACT

Conveyor systems and methods for transporting articles, such as containers, using the conveyor systems are provided. The conveyor systems include a lubricious liner adhesively attached to a surface of a conveyor or an article for transport on the conveyor, such that the liner is disposed between the article and the surface. The lubricious liners facilitate the transport of the articles by the conveyor systems.

73 Claims, 3 Drawing Sheets

LUBRICIOUS LINERS AND METHODS FOR THEIR USE

CROSS-REFERENCE TO RELATED APPLICATIONS

This application claims priority of U.S. Provisional Application Ser. No. 60/513,384 filed Oct. 22, 2003.

STATEMENT REGARDING FEDERALLY SPONSORED RESEARCH

Not applicable.

FIELD OF THE INVENTION

This invention relates to plastic films for use as lubricious liners on conveyor systems and on articles that are transported by conveyor systems. More specifically, the invention relates to conveyors, and/or articles for transport on conveyors, having low friction liners attached adhesively thereto. In one embodiment, when the liner is no longer needed it may be peeled away from the surface and discarded.

BACKGROUND OF THE INVENTION

In the food and beverage industry, filling and packaging operations require the use of table top conveyor lines for moving containers. In order to maintain high production speeds, lubricants are required to keep packaging upright and provide for the smooth operation of the conveying equipment. Conveyor lubricants must also be compatible with packaging materials. For example, they cannot lead to stress cracking of polyethylene bottles or wicking of paper board containers. Lubricants also provide secondary benefits by assisting in maintaining the overall hygiene of the conveying equipment.

The conventional approach to conveyor lubrication has been the use of water-based lubricant solutions consisting of soaps and/or synthetic materials to lubricate the interface between the conveyor surface and the containers being transported. Conventional soap-based lubrication technology typically involves the use of sodium or potassium salts of fatty acids such as oleic and coconut fatty acids. Conventional water-based synthetic materials for use in conveyor lubricants have included fatty amines, phosphate esters, sarcosinates, and the like. Unfortunately, these conventional lubricants create significant problems with lubricant runoff and cleanup and often require frequent reapplication of the lubricant to the interface between the conveyor and the containers. The presence of water in these lubricants also raises hygiene concerns and may necessitate the use of biocides. In addition, biocides and other chemicals present in these wet lubricants may lead to the need for enhanced waste water treatments, increasing the cost and reducing the efficiency of the lubrication process.

More recent advances have moved toward oil-based lubricants. Some such lubricants include mineral, vegetable and silicone oils. However, even these non-aqueous lubricants often require frequent reapplication. Moreover, the majority of these waterless lubricants remain liquid at room temperature. Thus, their transport and initial application may still present problems with respect to runoff and clean-up.

Another common problem for conveyor installations that use conventional lubricants is the need to apply different lubricants to machine parts made from different materials or to apply lubricants to hard-to-reach surfaces. For example, the stationary parts of a conveyor system, such as can transfer plates and dead plates, may be difficult to access or may be made from different materials than the conveying surfaces and may require a different lubricant composition than the conveying surfaces. This complicates the lubricant application process, increases costs and reduces efficiency.

Thus, a need exists for a simple, cost-effective lubrication system for conveyors and articles transported thereon that avoids the problems associated with presently available lubricants.

SUMMARY OF THE INVENTION

One aspect of the invention provides a conveyor system including a conveying surface with a lubricious liner adhesively attached thereto. Also provided is a system for transporting an article along a conveying surface of a conveyor system. The system includes a lubricious liner which may be adhesively attached to either the conveying surface or a surface of the article, provided at least a portion of the liner is disposed between the article and the conveying surface.

Methods for lubricating the transport of an article on a conveying surface of a conveyor system are also provided. The methods include the steps of adhesively attaching a lubricious liner to the conveying surface or to the article, such that at least a portion of the liner is disposed between the article and the conveying surface, and transporting the article on the conveying surface.

A second aspect of the invention provides a conveyor system including a stationary surface with a lubricious liner adhesively attached thereto. Stationary surfaces that may be advantageously lined in accordance with this aspect of the invention include, but are not limited to, can transfer plates, dead plates, conveyor rails and wear strips.

In these aspects of the invention, the lubricious liner acts as a lubricating surface and facilitates the transport of articles, such as containers, along the conveying or stationary surface without the need for messy lubricant formulations. The liner may be made from any suitable material that facilitates the transport of the article on the surface relative to the transport of the article in the absence of the liner. For example, the liner may be made from a plastic, including, but not limited, to a polyolefin, a polyvinyl, a polyacrylic, or a polyester. In some embodiments, a liner having a matte (or embossed) finish, rather that a glossy finish, may be used. The use of a matte or embossed liner is advantageous because the surface finish provides a lower interfacial contact area between the surface and article being transported on or over the surface, thereby reducing friction.

The adhesive used to affix the liner to the surface or to the article may be selected from a variety of well-known and commercially available adhesives. As one of skill in the art would recognize, the choice of a suitable adhesive will depend, at least in part, on the materials from which the liner, the surface and/or the article are made. In one desirable embodiment, the adhesive has a greater affinity for the liner than for the surface or the article to which it is affixed, such that the liner may be cleanly and relatively easily peeled away from the surface or the article. Suitable examples of adhesives that may be used to secure the liner to the surface or the article include, but are not limited to, pressure sensitive adhesives, heat sensitive adhesives and thermally activated adhesives.

The conveyor system may optionally include a lubricant composition applied to at least a portion of the lubricious liner in order to further enhance its lubricating properties. In some embodiments, the lubricious liner is applied to one or more conveying surfaces of the conveyor system and to one or more stationary surfaces of the conveying system and a lubricant is applied over the liner. Because the stationary and conveying surfaces are lined with the same material, a single lubricant composition may be used to lubricate both the conveying and stationary surfaces.

DETAILED DESCRIPTION OF THE PREFERRED EMBODIMENTS

Figure 1:
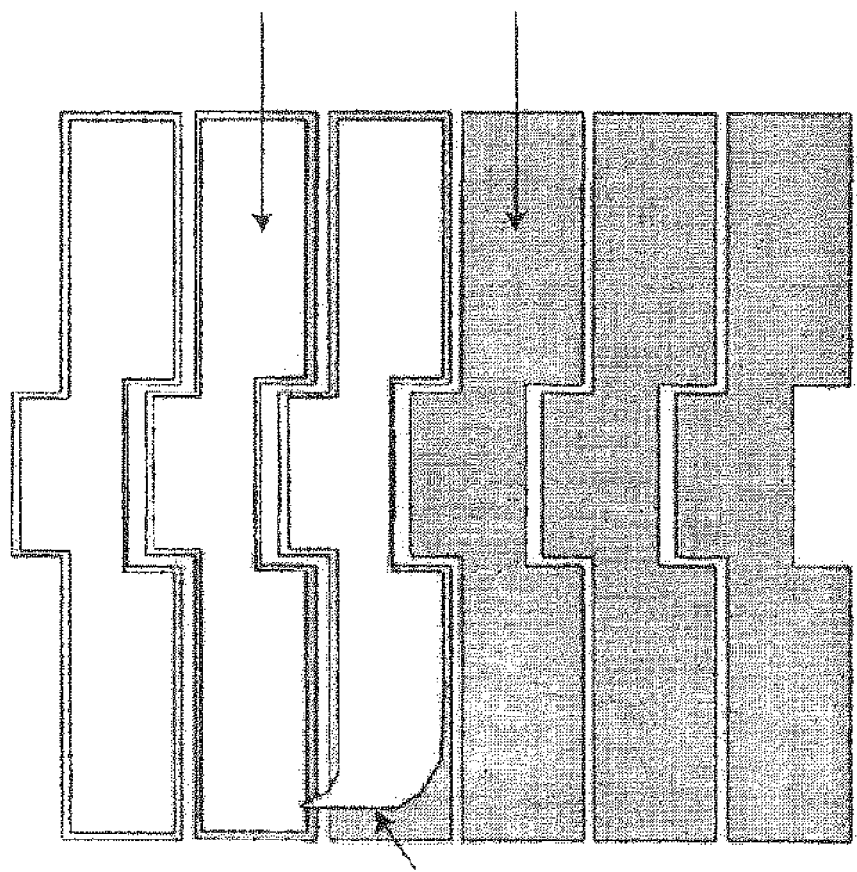
FIG. 1 shows a schematic diagram of a preformed peelable lubricious liner on a conveyor track.
Figure 1:
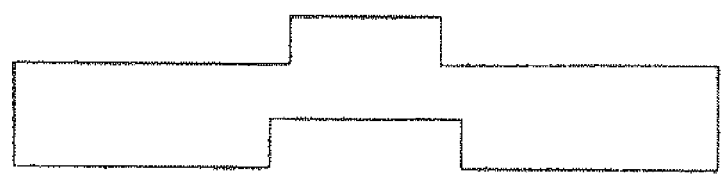

Conveyor systems and methods for transporting articles are provided. The conveyor systems include a lubricious liner that is positioned between a conveying surface and/or a stationary surface of a conveyor system and an article for transport on the surface. The lubricious liner provides a surface having a relatively low coefficient of friction and acts as a lubricant between the surface and any articles transported thereon. In one embodiment, the lubricious liner is adhesively attached to the surface while in other embodiments the lubricious liner is adhesively attached to at least one surface of an article to be conveyed. In either embodiment, the liner should be positioned such that at least a portion of the liner is disposed between the surface and the article, such that the liner facilitates the transport of the article.

As used herein, the term "lubricious liner" refers to a liner that facilitates the transport of a article along a surface. For example, a "lubricious liner" may be a liner that reduces the coefficient of friction for an article being transported along a surface relative to the coefficient of friction that would be experienced in the absence of the liner. In some instances, the coefficient of friction between the liner and the opposing surface (i.e. the surface to which the liner is not adhesively attached, either the conveying and/or stationary surface or the article surface) may be no more than about 0.2 as measured by a short track conveyor test. This includes embodiments where the coefficient of friction is no more than about 0.18 and further includes embodiments where the coefficient of friction is no more than about 0.16 as measured by a short track conveyor test. In some embodiments the coefficient of friction will be from about 0.1 to about 0.15. The short track conveyor test used to measure the coefficients of friction is described in detail in the Examples section below.

The lubricious liner may be made of a sheet of any suitable material provided that material is capable of facilitating the transfer of an article along a surface of a conveyor. Thus, whether a material is acceptable for use in the liner may depend, at least in part, on the materials that make up the surface and/or the article. Some exemplary liners may be made of plastics, including, but not limited to, polyolefins, polyvinyls, polyacrylics, and polyesters. Suitable polyvinyl liners include, but are not limited to, liners comprised of polyvinyl chloride, polyvinyl acetate, ethylene vinyl acetate, and combinations thereof. For example, a vinyl liner might be made from mostly polyvinyl chloride with smaller amounts (e.g. no more than about 10 wt. %) of polyvinyl acetate and/or ethylene vinyl acetate. Suitable polyester liners include, but are not limited to, liners comprised of polyethylene terephthalate (PET). The liners are desirably made from a material that is compatible with and may be cleaned with conventional cleaners used with conveying systems.

Figure 2:
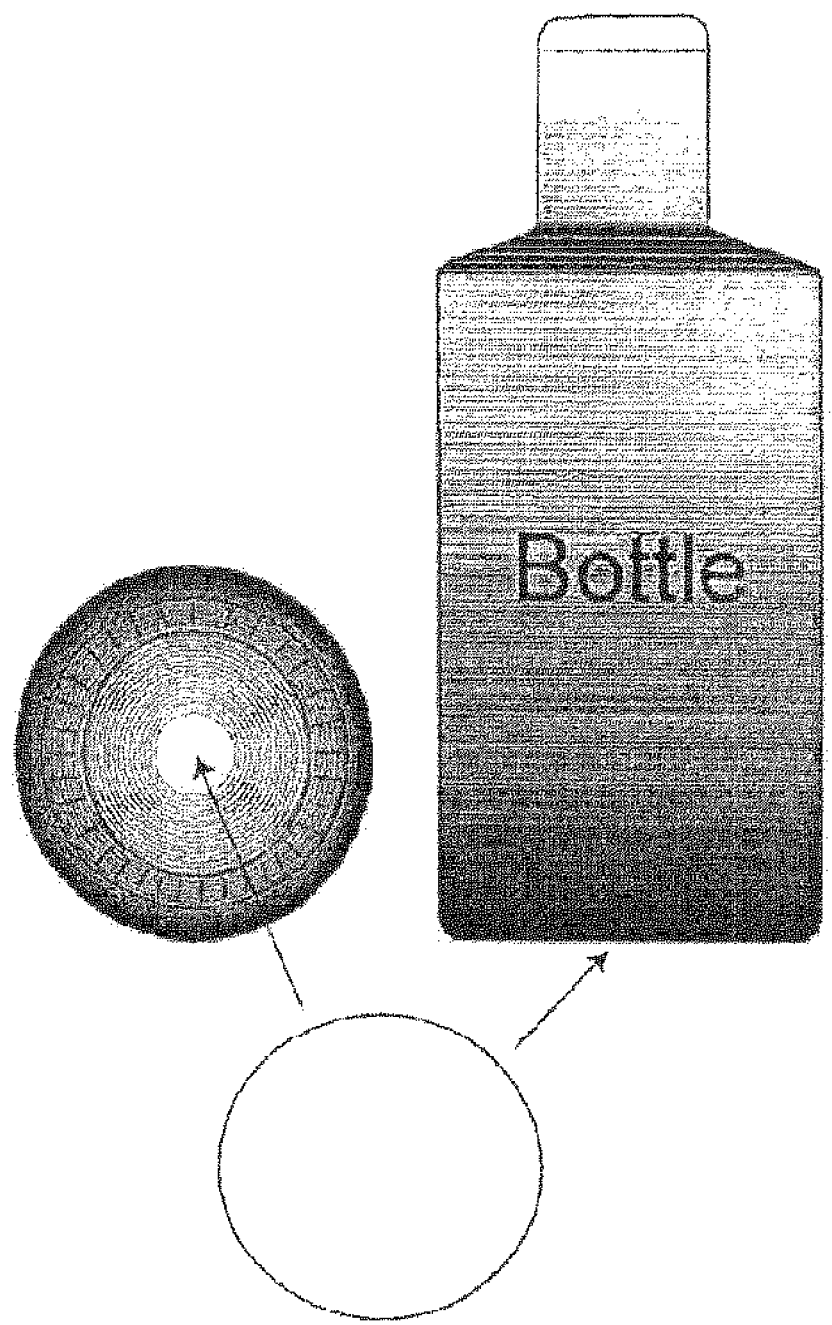
FIG. 2 shows a schematic diagram of a preformed film placed on the bottom of a bottle.

The size, shape and thickness of the liner is not critical provided the liner does not impair the operation of the conveying system once in place. The liner may be designed to completely cover a conveying surface or an article to be conveyed. Alternatively, the liner may by designed to cover only those portions of a conveying surface or an article that form the conveying surface/article interface during the operation of the conveying system. For example, when the conveying surface is a conveyor track, the liner may comprise a plurality of sections, each of which covers or substantially covers the surface of an individual link. FIG. 1 shows a schematic diagram of a preformed liner 100 on a section of a conveyor track 102. The lower surface 104 of the liner 100 (i.e. the surface that is disposed against the track 102) has an adhesive applied thereon that adheres the liner to the track and allows for easy removal. FIG. 2 shows a schematic diagram of a preformed liner 200 applied to the bottom of a bottle 202. The upper surface 204 of the liner 200 (i.e. the surface that is disposed against the bottle 202) has an adhesive applied thereon that adheres the liner to the bottle. The lubricious liners may be applied to stationary surfaces of the conveying system as well. Stationary surfaces to which the liners may be usefully applied include, but are not limited to, can transfer plates, dead plates, conveyor rails and wear strips. Where more than one surface is lined, different surfaces may be lined with liners having different compositions. Alternatively, all of the lined surfaces may be lined with liners having the same composition.

The liners may optionally be embossed, that is, they may have a textured (e.g. matte) surface that provides them with lubricious properties. The advantage of using a textured liner may be attributed to the reduced surface contact area between the surface and the article being transported thereon. The embossing may extend substantially over the entire liner surface or may be limited to portions of the surface. The extent of embossing is desirably, but not necessarily, sufficient to provide a contact area of no more than about 0.005 $in^2$ per square inch of liner. This includes embodiments where the contact area is no more than about 0.002 $in^2$ per square inch of liner, further includes embodiments where the contact area is no more than about 0.001 $in^2$ per square inch of liner, still further includes embodiments where the contact area is no more than about 0.0005 $in^2$ per square inch of liner and even further includes embodiments where the contact area is no more than about 0.0001 $in^2$ per square inch of liner.

Figure 3:
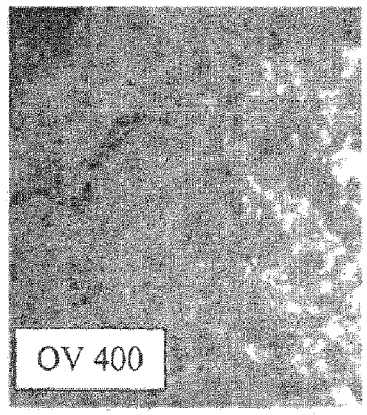
FIG. 3 shows an optical micrograph of the embossing patterns on three lubricious liners.
Figure 3:
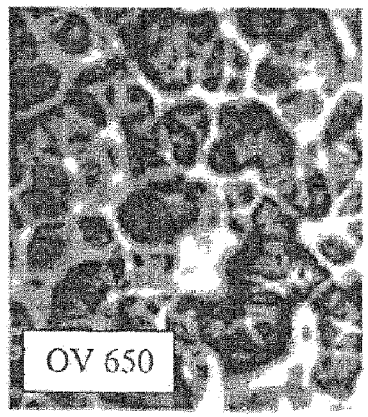
Figure 3:
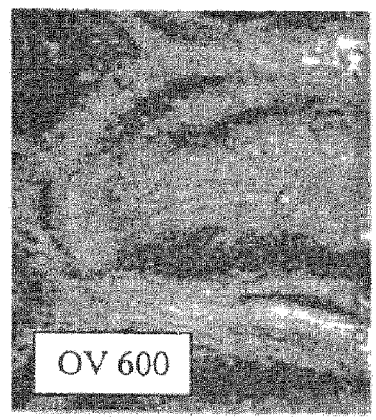

FIG. 3 shows optical micrographs of the embossing patterns for three matte-finished vinyl liners available from FLEXcon, Spencer, Mass. From left to right, the three liners in FIG. 3 are sold under the tradenames: 1) FLEXmark® OV 400 H Clear Velvet V-29 71-B PMO-8; 2) FLEXmark® OV 650 R Clear Velvet L-29 71-B PMO-8; and 3) FLEXmark®OV 600-FC Safari V-29 71-B PMO-8. The three films provide contact surface areas of 0.000017 $in^2$, 0.00091 $in^2$ and 0.000059 $in^2$ per square inch of liner, respectively.

In one embodiment the conveyor system includes both conveying and stationary surfaces that are coated with lubricious liners composed of the same material and a lubricant composition is applied to the liners. Because the surfaces are coated with a single material, a single lubricant may be used on all of the lined surfaces.

In some instances it may be desirable to coat the lubricious liners with a lubricating composition in order to enhance their lubricating properties. The lubricating composition may be any lubricant that is compatible with the liner and the adhesive used to secure the liner to the surface. Suitable lubricant compositions include conventional conveyor belt lubricants, and in particular, conveyor belt lubricants used in the bottling industry. Examples of suitable lubricants include, but are not limited to, water-based lubricants, oil-based lubricants, silicone-based lubricants and solid lubricants. Commercially available conveyor belt lubricants that may be used with the lubricious liners provided herein include, but are not limited to, Dicolube TPB, Dicolube Track Treat, Dicolube PL and Dicolube RS-148 available from JohnsonDiversey, Inc., Racine, Wis. Other suitable conveyor belt lubricants are described in U.S. Pat. Nos. 4,521,321; 4,604,220; 4,769,162; 4,929,375; 5,062,978; 5,062,979; 5,334,322; 5,352,376; 5,559,087; 5,747,431; 5,925,601 and 6,495,494, which are incorporated herein by reference.

In some instances, the liners may have a thickness of no more than about 20 mils (one mil=1/1000 inch), although thicker liners may also be used. This includes embodiments where the liners have a thickness of no more than about 10 mils and still further includes embodiments where the liners have a thickness of no more than about 1 mil. For example, a liner may have a thickness from about 0.001 mils to 20 mils, desirably from about 0.04 mils to 0.2 mils.

The conveyor systems with which the lubricious liners may be used may be any type of conveyor system designed to transport articles from one location to another. Such conveyor systems are widely used in a vast array of industries. Examples of suitable conveyor systems include, but are not limited to, those used to transport bottles and cans in the bottling and canning industries. The conveying systems will include at least one conveying surface. As used herein a "conveying surface" is a surface that moves in order to transport an article. Examples of conveying surfaces include conveyor belts and conveyor tracks. The conveying surface may be made of a variety of materials, including, but not limited to, metals, such as stainless steel, and polymers, such as nylon and polyacetal.

The adhesive used to secure the liner to either the surface or the article may be any adhesive which is compatible with the materials of the liner, the surface and/or the article. The adhesive is desirably a pressure sensitive adhesive, heat sensitive adhesive or thermally activated adhesive. In one embodiment the adhesive is chosen such that it has a greater affinity for the liner than for the surface or the article to which the liner is attached. This allows the liner to be peeled relatively cleanly and easily from the surface or the article once it becomes damaged or is no longer necessary. The relatively simple and clean removal of these liners represents a significant advantage over conventional conveyor lubricant formulations. Typically, the adhesive layer on the liner will range from about 20 to 100 μm, however the liners provided herein are not limited to those with an adhesive layer thickness in this range.

Specific examples of suitable adhesives include acrylic adhesives. Other suitable adhesives include, but are not limited to, silicone adhesives, synthetic rubber adhesives, natural rubber adhesives, or combinations thereof. In some embodiments, the adhesives desirably, but not necessarily, have a tack in the range of about 150 to 1000 g/cm$^2$, desirably from about 400 to about 1000 g/cm$^2$, and/or an average adhesion value in the range of about 10 to 2000 N/m, desirably from about 500 to 1600 N/m. Pressure sensitive acrylic adhesives that may be used with the lubricious liners provided herein are available from FLEXcon (Spencer, Mass.) under the tradenames FLEXmark® V-58 and FLEXmark® V-314.

The adhesive may be applied to the liner just prior to affixing the liner to either the surface or the article or the adhesive may be applied to the surface or the article just prior to affixing the liner thereto. Alternatively, the adhesive may be pre-applied to the liner, such that the liner is sold or otherwise provided with the adhesive already in place. In such an embodiment, the liner will desirably include a protective release layer over the adhesive that is easily removed prior to the application of the liner to the conveying surface or the article. Suitable liners having suitable adhesives pre-applied thereto are commercially available and include, but are not limited to, FLEXmark® OV 400 H Clear Velvet V-29 71-B PMO-8; FLEXmark® OV 600-FC Safari V-29 71-B PMO-8; FLEXmark® OV 650 R Clear Velvet L-29 71-B PMO-8; FLEXmark® V 400 H Clear V-327 90 PFW (data sheet); FLEXmark® V 400 H Clear A-109 90 PFW; FLEXmark® OV 650 R Clear Velvet V-29 42 White PP-8; and FLEXmark® DM 200 Clear P/T/P V-314 90 PFW from FLEXcon, Spencer, Mass.

The articles to be conveyed using the conveyor systems and methods described herein include any article that is transported on a conveyor system. Containers are examples of such articles. Typical containers include, but are not limited to, bottles, cans, cartons, boxes and the like. The containers may be made of a variety of materials. In one embodiment the container is a glass container, such as a glass bottle. In another embodiment the container is a plastic container, such as a plastic bottle. In another embodiment the container is a metal container, such as an aluminum or tin can. In yet another embodiment the container is a paper container, such as a paper carton.

EXAMPLES

Two lubricious liners were applied to conveyor tracks made from stainless steel or polyacetal. Glass and PET bottles were transported on the lined tracks and the coefficients of friction between the bottles and the tracks were measured using a short track conveyor test. The coefficients of friction were measured under both dry and wet conditions.

The short track conveyor tests were conducted as follows. The stainless steel conveyor track was a laboratory table top conveyor system with a six foot straight track having 97 links, available from Krones Inc., Franklin Wis. or KHS, Sarasota, Fla. The polyacetal conveyor track was a laboratory table top conveyor system with a six foot straight track having 97 links, available from Rexnord Industries, Inc., Milwaukee, Wis. Each liner was cut into pieces to match the shape of the individual chain links of the conveyor tracks. One piece of the liner was applied to each link and the liner was pressed firmly against the surface of the link. Six containers (either 12 oz. glass bottles or 20 oz. PET bottles) were placed on the conveyor track and held stationary as the conveyor track was allowed to run at a speed of 4.2–4.6 feet/second. The six bottles were placed onto the conveyor track one by one into a load cell loop connected to a strain gage load cell (model no. 363-D3-50-20pl from Process Instrument and Valves, Inc.). The load cell was interfaced with a digital indicator (model IMS from Process Instruments and Valves, Inc.) and calibrated at regular intervals following the standard instructions provided with the meter. A calibration jig may be used to calibrate the load cell. The calibration jig is an apparatus that suspends a low friction pulley (4") off the back of the conveyor track. Small gage calibration wire or cable (of negligible mass) is secured to the load cell and draped over the pulley. A weight is secured to the opposite end during the calibration of the load cell. The total weight of the bottles and the load cell loop was about 4000 grams for the glass bottles and 3500 grams for the PET bottles. The conveyor with the bottles was allowed to run for 30 minutes while drag levels were recorded or by a data acquisition system. The drag levels may be read from a strip chart recorder. After 30 minutes a final drag reading was recorded.

In some instances, once the dry run measurements were completed, the coated conveyor was sprayed with tap water to wet the conveyor surface for two minutes at a flow rate of 80–100 grams/minute to determine the effect on the coefficient of friction and liner adhesion.

The lubricity of a particular liner was measured as the bottle drag in the horizontal plane divided by a known load in the vertical plane. Coefficient of friction values were measured using dry liners and liners that had been exposed to water. To obtain this measurement, the final drag measurement was converted to a coefficient of friction (COF) measurement using the following calculation:

COF=drag in the horizontal plane (from load cell)

total bottle weight.

The results are presented in Table 1. In the table, "Film A" refers to a matte polyvinyl chloride film available from FLEXcon under the Tradename FLEXmark® OV 650 R Clear Velvet and "Film B" refers to a glossy polyvinyl chloride film available from FLEXcon under the Tradename FLEXmark® V 400 H Clear. As shown in Table 1, the coefficient of friction measurements for the liners ranged from about 0.14 to 0.20 under dry conditions and from about 0.11 to 0.16 under wet conditions.

| CONTAINER TYPE | FILM TYPE | COF (DRY) | COF (WET) | TRACK TYPE |
| --- | --- | --- | --- | --- |
| Glass | Film A | 0.14 | NA | Stainless Steel |
| Glass | Film A | 0.15 | NA | Polyacetal |
| PET | Film A | 0.17 | NA | Polyacetal |
| Glass | Film A | NA | 0.16 | Polyacetal |
| PET | Film B | NA | 0.16 | Polyacetal |
| PET | Film B | 0.20 | NA | Polyacetal |
| Glass | Film B | NA | 0.11 | Polyacetal |

The invention has been described with reference to very specific and illustrative embodiments. However, it should be understood that many variations and modifications may be made while remaining within the spirit and scope of the invention.

What is claimed is:

1. A conveyor system comprising:
   (a) a conveying surface; and
   (b) a lubricious liner adhesively attached to the conveying surface;
   wherein the liner is adhesively attached to the conveying surface with an adhesive having a greater affinity for the liner than for the conveying surface.

2. The conveyor system of claim 1, wherein at least a portion of the liner is embossed.

3. The conveyor system of claim 1, wherein the liner may be removed by peeling the liner from the conveying surface.

4. The conveyor system of claim 1, wherein the liner comprises a material selected from the group consisting of polyolefins, polyvinyls, polyacrylics and polyesters.

5. The conveyor system of claim 1, wherein the liner comprises a material selected from the group consisting of polyvinyl chloride, polyvinyl acetate, ethylene vinyl acetate or a combination thereof.

6. The conveyor system of claim 1, wherein the liner comprises polyethylene terephthalate.

7. The conveyor system of claim 1, wherein the liner is adhesively attached to the conveying surface with a pressure sensitive adhesive, a heat sensitive adhesive or a thermally activated adhesive.

8. The conveyor system of claim 1, wherein the liner is adhesively attached to the conveying surface with an acrylic adhesive.

9. The conveyor system of claim 1, wherein the liner is adhesively attached to the conveying surface with an adhesive selected from the group consisting of silicone adhesives, synthetic rubber adhesives, natural rubber adhesives and mixtures thereof.

10. The conveyor system of claim 1, wherein the liner provides a coefficient of friction between the liner and an article transported thereon of no more than 0.2 as measured by a short track conveyor test.

11. The conveyor system of claim 1, wherein The liner provides a coefficient of friction between the liner and an article transported thereon of no more than 0.18 as measured by a short track conveyor test.

12. The conveyor system of claim 1, wherein the liner provides a coefficient of friction between the liner and an article transported thereon of no more than 0.16 as measured by a short track conveyor test.

13. The conveyor system of claim 1, wherein the liner has a thickness of no more than 20 mils.

14. The conveyor system of claim 1, wherein The conveying surface comprises a material selected from the group consisting of polyacetal, nylon and stainless steel.

15. The conveyor system of claim 1, wherein the conveying surface is a conveyor belt, a conveyor track or a conveyor chain.

16. The conveyor system of claim 1, further comprising a lubricant composition coated onto the lubricious liner.

17. A system for transporting an article on a conveyor, the system comprising:
   (a) a conveying surface;
   (b) an article for transport on the conveying system; and
   (c) a lubricious liner adhesively attached to at least one surface of the article, wherein at least a portion of the liner is disposed between the conveying surface and the article.

18. The system of claim 17, wherein the article is a container.

19. The system of claim 17, wherein the liner comprises a material selected from the group consisting of polyolefins, polyvinyls, polyacrylics and polyesters.

20. The system of claim 17, wherein the liner is adhesively attached to the conveying surface with a pressure sensitive adhesive, a heat sensitive adhesive or a thermally activated adhesive.

21. The system of claim 17, wherein the liner provides a coefficient of friction between the liner and the conveying surface of no more than 0.2 as measured by a short track conveyor test.

22. A conveyor system comprising:
   (a) a conveying surface;
   (b) a stationary surface; and (c) a lubricious liner adhesively attached to the stationary surface, wherein at least a portion of the lubricious liner is embossed;

wherein the embossed portion of the lubricious liner provides a contact area of no more than about 0.001 in$^2$ per square inch of liner.

23. A method for lubricating the passage of an article on a conveying surface of a conveyor comprising:

(a) adhesively attaching a lubricious liner to the conveying surface or to the article such that at least a portion of the liner is disposed between the article and the conveying surface; and (b) transporting the article along the conveying surface;

wherein the liner provides a coefficient of friction between the liner and the conveying surface or the article of no more than 0.2 as measured by a short track conveyor test.

24. The method of claim 23, wherein at least a portion of the liner is embossed.

25. The method of claim 23, wherein the liner maybe removed by peeling the liner from the conveying surface or the article.

26. The method of claim 23, wherein the liner comprises a material selected from the group consisting of polyolefins, polyvinyls, polyacrylics and polyesters.

27. The method of claim 23, wherein the liner comprises a material selected from the group consisting of polyvinyl chloride, polyvinyl acetate, ethylene vinyl acetate or a combination thereof.

28. The method of claim 23, wherein the liner comprises polyethylene terephthalate.

29. The method of claim 23, wherein the liner is attached to the conveying surface or the article with a pressure sensitive adhesive, a heat sensitive adhesive or a thermally activated adhesive.

30. The method of claim 23, wherein the liner is attached to the conveying surface or the article with an acrylic adhesive.

31. The method of claim 23, wherein the liner is attached to the conveying surface or the article with an adhesive selected from the group consisting of silicone adhesives, synthetic rubber adhesives, natural rubber adhesives and mixtures thereof.

32. The method of claim 23, wherein the liner provides a coefficient of friction between the liner and the conveying surface or the article of no more than 0.16 as measured by a short track conveyor test.

33. The method of claim 23, wherein the liner has a thickness of no more than 20 mils.

34. The method of claim 23, wherein the conveying surface comprises a material selected from the group consisting of polyacetal, nylon and stainless steel.

35. The method of claim 23, wherein the conveying surface is a conveyor belt, a conveyor track or a conveyor chain.

36. The method of claim 23, wherein the lubricious liner is adhesively attached to a conveying surface, the method further comprising adhesively attaching a lubricious liner to a stationary surface of the conveyor.

37. The method of claim 23, further comprising applying a lubricating composition to the lubricious liner.

38. The method of claim 36, further comprising applying a lubricating composition to the lubricious liner on the conveying surface and the lubricious liner on the stationary surface.

39. The method of claim 23, wherein the article is a container.

40. A method for lubricating the passage of an article on a conveying surface of a conveyor comprising:

(a) adhesively attaching a lubricious liner to the conveying surface or to the article such that at least a portion of the liner is disposed between the article and the conveying surface; and (b) transporting the article along the conveying surface;

wherein the liner is adhesively attached to the conveying surface with an adhesive having a greater affinity for the liner than for the conveying surface.

41. The method of claim 40, wherein at least a portion of the liner is embossed.

42. The method of claim 40, wherein the liner may be removed by peeling the liner from the conveying surface or the article.

43. The method of claim 40, wherein the liner comprises a material selected from the group consisting of polyolefins, polyvinyls, polyacrylics and polyesters.

44. The method of claim 40, wherein the liner comprises a material selected from the group consisting of polyvinyl chloride, polyvinyl acetate, ethylene vinyl acetate or a combination thereof.

45. The method of claim 40, wherein the liner comprises polyethylene terephthalate.

46. The method of claim 40, wherein the liner is attached to the conveying surface or the article with a pressure sensitive adhesive, a heat sensitive adhesive or a thermally activated adhesive.

47. The method of claim 40, wherein the liner is attached to the conveying surface or the article with an acrylic adhesive.

48. The method of claim 40, wherein the liner is attached to the conveying surface or the article with an adhesive selected from the group consisting of silicone adhesives, synthetic rubber adhesives, natural rubber adhesives and mixtures thereof.

49. The method of claim 40, wherein the liner provides a coefficient of friction between the liner and the conveying surface or the article of no more than 0.2 as measured by a short track conveyor test.

50. The method of claim 40, wherein the liner provides a coefficient of friction between the liner and the conveying surface or the article of no more than 0.16 as measured by a short track conveyor test.

51. The method of claim 40, wherein the liner has a thickness of no more than 20 mils.

52. The method of claim 40, wherein the conveying surface comprises a material selected from the group consisting of polyacetal, nylon and stainless steel.

53. The method of claim 40, wherein the conveying surface is a conveyor belt, a conveyor track or a conveyor chain.

54. The method of claim 40, wherein the lubricious liner is adhesively attached to a conveying surface, the method further comprising adhesively attaching a lubricious liner to a stationary surface of the conveyor.

55. The method of claim 40, further comprising applying a lubricating composition to the lubricious liner.

56. The method of claim 54, further comprising applying a lubricating composition to the lubricious liner on the conveying surface and the lubricious liner on the stationary surface.

57. The method of claim 40, wherein the article is a container.

58. A conveyor system comprising:
(a) a conveying surface; and
(b) a lubricious liner adhesively attached to the conveying surface;
wherein the liner provides a coefficient of friction between the liner and an article transported thereon of no more than 0.2 as measured by a short track conveyor test.

59. The conveyor system of claim 58, wherein at least a portion of the liner is embossed.

60. The conveyor system of claim 58, wherein the liner may be removed by peeling the liner from the conveying surface.

61. The conveyor system of claim 58, wherein the liner is adhesively attached to the conveying surface with an adhesive having a greater affinity for the liner than for the conveying surface.

62. The conveyor system of claim 58, wherein the liner comprises a material selected from the group consisting of polyolefins, polyvinyls, polyacrylics and polyesters.

63. The conveyor system of claim 58, wherein the liner comprises a material selected from the group consisting of polyvinyl chloride, polyvinyl acetate, ethylene vinyl acetate or a combination thereof.

64. The conveyor system of claim 58, wherein the liner comprises polyethylene terephthalate.

65. The conveyor system of claim 58, wherein the liner is adhesively attached to the conveying surface with a pressure sensitive adhesive, a heat sensitive adhesive or a thermally activated adhesive.

66. The conveyor system of claim 58, wherein the liner is adhesively attached to the conveying surface with an acrylic adhesive.

67. The conveyor system of claim 58, wherein the liner is adhesively attached to the conveying surface with an adhesive selected from the group consisting of silicone adhesives, synthetic rubber adhesives, natural rubber adhesives and mixtures thereof.

68. The conveyor system of claim 58, wherein the liner provides a coefficient of friction between the liner and an article transported thereon of no more than 0.18 as measured by a short track conveyor test.

69. The conveyor system of claim 58, wherein the liner provides a coefficient of friction between the liner and an article transported thereon of no more than 0.16 as measured by a short track conveyor test.

70. The conveyor system of claim 58, wherein the liner has a thickness of no more than 20 mils.

71. The conveyor system of claim 58, wherein the conveying surface comprises a material selected from the group consisting of polyacetal, nylon and stainless steel.

72. The conveyor system of claim 58, wherein the conveying surface is a conveyor belt, a conveyor track or a conveyor chain.

73. The conveyor system of claim 58, further comprising a lubricant composition coated onto the lubricious liner.

* * * * *